(12) United States Patent
Irie et al.

(10) Patent No.: US 12,131,491 B2
(45) Date of Patent: Oct. 29, 2024

(54) DEPTH ESTIMATION DEVICE, DEPTH ESTIMATION MODEL LEARNING DEVICE, DEPTH ESTIMATION METHOD, DEPTH ESTIMATION MODEL LEARNING METHOD, AND DEPTH ESTIMATION PROGRAM

(71) Applicant: NIPPON TELEGRAPH AND TELEPHONE CORPORATION, Tokyo (JP)

(72) Inventors: Go Irie, Tokyo (JP); Takahito Kawanishi, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 268 days.

(21) Appl. No.: 17/609,717

(22) PCT Filed: May 10, 2019

(86) PCT No.: PCT/JP2019/018831
§ 371 (c)(1),
(2) Date: Nov. 8, 2021

(87) PCT Pub. No.: WO2020/230214
PCT Pub. Date: Nov. 19, 2020

(65) Prior Publication Data
US 2022/0215567 A1    Jul. 7, 2022

(51) Int. Cl.
*G06T 7/55* (2017.01)
*G06V 20/64* (2022.01)

(52) U.S. Cl.
CPC .............. *G06T 7/55* (2017.01); *G06V 20/647* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS 11,062,475 B2 *   7/2021   Nakashima .............. G06N 3/08
2019/0139179 A1 *   5/2019   Wang .................... G06T 3/0093
(Continued)

FOREIGN PATENT DOCUMENTS

JP         2017112419 A      6/2017

OTHER PUBLICATIONS

Laina et al. (2016) "Deeper Depth Prediction with Fully Convolutional Residual Networks" Proc. International Conference on 3D Vision (3DV), Oct. 25, 2016, pp. 239-248.
(Continued)

*Primary Examiner* — James A Thompson (57) ABSTRACT

An acquiring unit of a depth estimation apparatus acquires an input image. In addition, a depth map generating unit inputs the input image acquired by the acquiring unit into a depth estimator for generating, from an image, a depth map in which a depth of a space that appears on the image is imparted to each pixel of the image, and generates an estimated depth map that represents a depth map corresponding to the input image. The depth estimator is a model having been learned in advance so as to reduce, with respect to each error between a depth of the estimated depth map and a depth of a correct-answer depth map that presents the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

14 Claims, 6 Drawing Sheets

(56) References Cited

U.S. PATENT DOCUMENTS

2020/0151540 A1* 5/2020 Seki .................. G06F 18/22
2020/0351489 A1* 11/2020 Watson ............... G06T 7/85
2021/0358163 A1* 11/2021 Keinert .............. G06T 7/70

OTHER PUBLICATIONS

He et al. (2016) "Deep Residual Learning for Image Recognition" In Proc. IEEE Conference on Computer Vision and Pattern Recognition (CVPR), Jun. 27, 2016, pp. 770-778.
Ma et al. (2018) "Sparse-to-Dense: Depth Prediction from Sparse Depth Samples and a Single Image" IEEE International Conference on Robotics and Automation (ICRA), May 21, 2018.
Art B. Owen (2006) "A robust hybrid of lasso and ridge regression" [online] website: https://statweb.stanford.edu/~owen/reports/hhu.pdf.

* cited by examiner

DEPTH ESTIMATION DEVICE, DEPTH ESTIMATION MODEL LEARNING DEVICE, DEPTH ESTIMATION METHOD, DEPTH ESTIMATION MODEL LEARNING METHOD, AND DEPTH ESTIMATION PROGRAM

CROSS-REFERENCE TO RELATED APPLICATIONS

This application is a U.S. National Stage Application filed under 35 U.S.C. § 371 claiming priority to International Patent Application No. PCT/JP2019/018831, filed on 10 May 2019, the disclosure of which is hereby incorporated herein by reference in its entirety.

TECHNICAL FIELD

The disclosed technique relates to a depth estimation apparatus, a depth estimation model learning apparatus, a depth estimation method, a depth estimation model learning method, and a depth estimation program.

BACKGROUND ART

In recent years, there have been remarkable advances in image recognition technology. A well-known example of an application of image recognition technology is an application as eyes of a robot. For example, in the manufacturing industry, progress has been made in introducing factory automation using robots equipped with a function for estimating depth of a space that appears in an image. Considering advances made in image recognition techniques using robots, it is expected that image recognition techniques using robots will expand into fields that require more sophisticated image recognition such as conveyance and inventory management at retail or distribution sites, transportation, and shipping.

A technique for predicting a name (hereinafter, simply referred to as a "label") of a subject that appears in an image is known as a typical example of an image recognition technique. For example, when an apple appears in an arbitrary image, a desirable operation when the image is input to a model having a predetermined image recognition function involves outputting a label that reads "apple" or assigning a label that reads "apple" to a set of pixels representing a region in which the apple appears in the image.

On the other hand, as an image recognition technique that can be mounted to a robot as described above, simply outputting a label of a subject that appears in an image is often insufficient. For example, let us assume a case where, as an example of application of a robot at a retailer, the robot grasps or carries a product on an article shelf to move the product to a separate merchandise shelf. In this case, the robot must execute steps (1) to (3) below in order to complete the task.

(1) The robot identifies a product that is an object to be moved from various products arranged on the article shelf.

(2) The robot grasps the identified product.

(3) The robot moves or transports the identified product to the merchandise shelf that is a destination.

(4) The robot arranges the identified product in a desirable layout.

In addition to being able to recognize the article shelf, the product, and the merchandise shelf, the image recognition technique that the robot is equipped with must also enable the robot to accurately recognize three-dimensional shapes such as a structure of the article shelf and postures (positions, angles, sizes, and the like) of objects. Typical image recognition techniques such as that described earlier are not provided with functions for estimating such shapes and require separate techniques to estimate the shapes.

A shape of an object is recognized by obtaining a width of the object, a height of the object, a depth of the object, and the like. While the width of the object and the height of the object can be recognized from an image in which the object appears, the depth which represents information regarding a depth direction of the object cannot be recognized from the image. Therefore, in order to enable the depth of an object to be recognized, for example, two or more images in which the object appears having been photographed from different points of view are conceivably used as in a method described in PTL 1. Alternatively, a stereoscopic camera or the like is conceivably used to enable the depth of an object to be recognized.

However, the apparatus or the photographic method described above is not always available or applicable. Therefore, a method that enables the depth of an object to be obtained even from a single image is favorable. In consideration of such demands, techniques that enable the depth of an object to be estimated from an image in which the object appears have been devised and disclosed.

Methods using a deep neural network are known as techniques that have become mainstream in recent years. A deep neural network receives an image as an input. In addition, the deep neural network outputs a depth of each pixel in the received image. As a premise thereof, learning is performed with respect to the deep neural network so that an error of estimation between a depth of an image for learning and a depth of a correct answer decreases. In this case, just how the deep neural network is learned is particularly important.

For example, NPL 1 discloses a method of causing a network based on a Deep Residual Network (ResNet) disclosed in NPL 2 to be learned using a Reverse Huber loss (hereinafter, simply referred to as a "BerHu loss"). The BerHu loss is a piecewise function. Specifically, the BerHu loss is a function which takes a loss value that linearly increases in accordance with an increase in an error in a portion where an error of estimation of a depth is small and which takes a loss value that quadratically increases in accordance with an increase in an error in a portion where an error of estimation of a depth is large.

NPL 3 discloses a method of performing learning with respect to a network similar to that described in NPL 1 using an L1 loss that is a function that linearly increases as an error increases.

CITATION LIST

Patent Literature

[PTL 1] Japanese Patent Application Laid-open No. 2017-112419

Non Patent Literature

[NPL 1] Iro Laina, Christian Rupprecht, Vasileios Belagianis, Federico Tombari, and Nassir Navab, "Deeper Depth Prediction with Fully Convolutional Residual Networks," In Proc. International Conference on 3D Vision (3DV), pp. 239-248, 2016.

[NPL 2] Kaiming He, Xiangyu Zhang, Shaoqing Ren, and Jian Sun. "Deep Residual Learning for Image Recognition," In Proc. Conference on Computer Vision and Pattern Recognition (CVPR), 2016.

[NPL 3] Fangchang Ma and Sertac Karaman. "Sparse-to-Dense: Depth Prediction from Sparse Depth Samples and a Single Image," In Proc. International Conference on Robotics and Automation (ICRA), 2018.

SUMMARY OF THE INVENTION

Technical Problem

The techniques disclosed in NPL 1 to NPL 3 use a loss function which requests that learning be performed with respect to a region in which an error of estimation is large using a weight equivalent to or greater than that of a region in which an error of estimation is small as in the case of an L1 loss or a BerHu loss. This is comparable to causing a network to be learned by placing a greater emphasis on a region in which an error of estimation is large than a region in which an error of estimation is small among respective pixels of an image of which a depth is to be estimated.

However, usually, a region in which an error of estimation is large is often a region with an uncertain depth even when viewing the image such as a portion where a physical distance between a camera and a subject is long or a portion having a depth structure that is extremely complex.

As such, there is a problem in that causing a network to be learned by placing a greater emphasis on a region in which an error of estimation is large does not necessarily improve accuracy of estimation. Therefore, conventionally, there is a problem in that a depth representing a perspective which appears on an image cannot be accurately estimated from the image.

The disclosed technique has been devised in consideration of the points described above and an object thereof is to accurately estimate a depth of a space that appears on an image.

Means for Solving the Problem

A first aspect of the present disclosure is a depth estimation apparatus, including: an acquiring unit which acquires an input image; and a depth map generating unit which inputs the input image acquired by the acquiring unit into a depth estimator for generating, from an image, a depth map in which a depth of a space that appears on the image is imparted to each pixel of the image and which generates an estimated depth map that represents the depth map corresponding to the input image, wherein the depth estimator is a model having been learned in advance so as to reduce, with respect to each error between the depth of the estimated depth map for learning and the depth of a correct-answer depth map representing the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

A second aspect of the present disclosure is a depth estimation apparatus, wherein the loss function is a function which, when the error is larger than the threshold, takes the loss value that increases in accordance with a radical root of the error with respect to an increase in the error, and when the error is equal to or smaller than the threshold, takes the loss value that linearly increases with respect to an increase in the error.

A third aspect of the present disclosure is a depth estimation model learning apparatus, including: a learning depth map generating unit which inputs an image for learning into a depth estimator for generating, from an image, a depth map in which a depth of a space that appears on the image is imparted to each pixel of the image and which generates an estimated depth map for learning that is the depth map corresponding to the image for learning; and a learning unit which causes the depth estimator to perform learning so as to reduce a value of a loss function set such that a degree of increase of a loss value with respect to a pixel at which an error between the depth of the estimated depth map for learning having been generated by the learning depth map generating unit and the depth of a correct-answer depth map representing the depth map of a correct answer is larger than a threshold is smaller than a degree of increase of a loss value with respect to a pixel at which the error is equal to or smaller than the threshold.

A fourth aspect of the present disclosure is a depth estimation model learning apparatus, wherein the loss function is a function which, when the error is equal to or smaller than the threshold, takes the loss value that linearly increases with respect to an increase in the error, and when the error is larger than the threshold, takes the loss value that linearly varies with respect to a radical root of the error.

A fifth aspect of the present disclosure is a depth estimation model learning apparatus, wherein the learning unit further causes the depth estimator to perform learning so as to reduce an error between an edge representing a degree of variation of the depth of the estimated depth map for learning and an edge representing a degree of variation of the depth of the correct-answer depth map.

A sixth aspect of the present disclosure is a depth estimation method in which a computer executes processing for: acquiring an input image; and inputting the acquired input image into a depth estimator for generating, from an image, a depth map in which a depth of a space that appears on the image is imparted to each pixel of the image and generating an estimated depth map that represents the depth map corresponding to the input image, wherein the depth estimator is a model having been learned in advance so as to reduce, with respect to each error between the depth of the estimated depth map for learning and the depth of a correct-answer depth map representing the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

A seventh aspect of the present disclosure is a depth estimation model learning method in which a computer executes processing for: inputting an image for learning into a depth estimator for generating, from an image, a depth map in which a depth of a space that appears on the image is imparted to each pixel of the image and generating an estimated depth map for learning that is the depth map corresponding to the image for learning; and causing the depth estimator to perform learning so as to reduce a value of a loss function set such that a degree of increase of a loss value with respect to a pixel at which an error between the depth of the generated estimated depth map for learning and the depth of a correct-answer depth map representing the depth map of a correct answer is larger than a threshold is smaller than a degree of increase of a loss value with respect to a pixel at which the error is equal to or smaller than the threshold.

An eighth aspect of the present disclosure is a depth estimation program for causing a computer to execute processing for: acquiring an input image; and inputting the acquired input image into a depth estimator for generating, from an image, a depth map in which a depth of a space that appears on the image is imparted to each pixel of the image and generating an estimated depth map that represents the depth map corresponding to the input image, wherein the depth estimator is a model having been learned in advance so as to reduce, with respect to each error between the depth of the estimated depth map for learning and the depth of a correct-answer depth map representing the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

Effects of the Invention

The disclosed technique enables a depth of a space that appears on an image to be accurately estimated.

DESCRIPTION OF EMBODIMENTS

Hereinafter, examples of embodiments of the disclosed technique will be described with reference to the accompanying drawings. It should be noted that same or equivalent components and portions in the respective drawings will be assigned same reference signs. In addition, dimensional ratios in the drawings have been exaggerated for illustrative purposes and may differ from actual ratios.

First Embodiment

Figure 1:
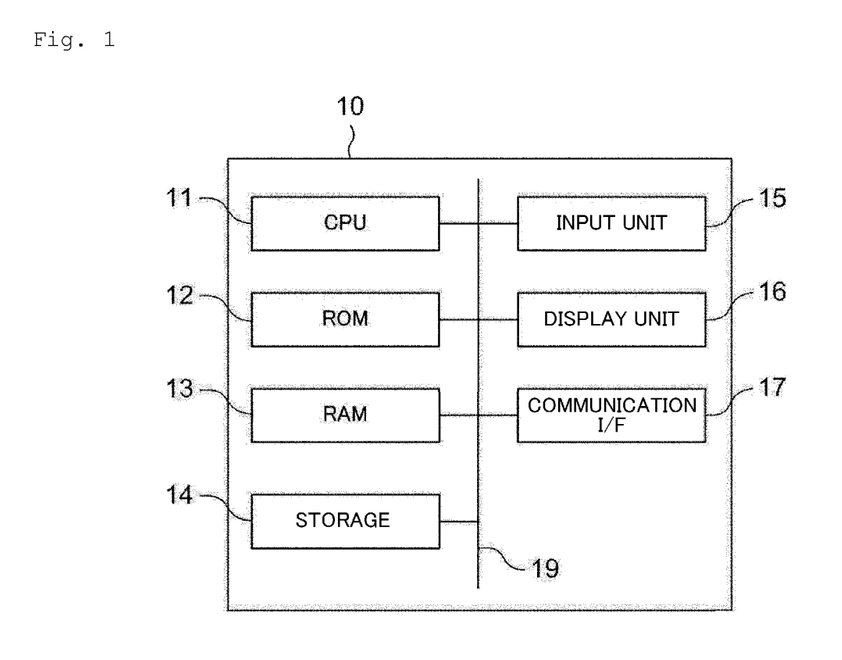
FIG. 1 is a block diagram showing a hardware configuration of a depth estimation apparatus 10 according to a first embodiment.

FIG. 1 is a block diagram showing a hardware configuration of a depth estimation apparatus 10 according to a first embodiment.

As shown in FIG. 1, the depth estimation apparatus 10 according to the first embodiment has a CPU (Central Processing Unit) 11, a ROM (Read Only Memory) 12, a RAM (Random Access Memory) 13, a storage 14, an input unit 15, a display unit 16, and a communication interface (I/F) 17. The respective components are connected to each other via a bus 19 so as to be capable of mutual communication.

The CPU 11 is a central processing unit which executes various programs and controls the respective units. In other words, the CPU 11 reads programs from the ROM 12 or the storage 14 and executes the programs by using the RAM 13 as a work area. The CPU 11 controls the respective components described above and performs various types of computational processing in accordance with the programs stored in the ROM 12 or the storage 14. In the present embodiment, various programs that process information input using an input apparatus are stored in the ROM 12 or the storage 14.

The ROM 12 stores various programs and various types of data. The RAM 13 temporarily stores programs or data as a work area. The storage 14 is constituted by an HDD (Hard Disk Drive) or an SSD (Solid State Drive) and stores various programs including an operating system and various types of data.

The input unit 15 includes a pointing device such as a mouse and a keyboard and is used to perform various types of input.

The display unit 16 is, for example, a liquid crystal display and displays various types of information. The display unit 16 may adopt a touch panel system and may function as the input unit 15.

The communication interface 17 is an interface for communicating with other devices such as an input apparatus and a standard such as Ethernet (registered trademark), FDDI, or Wi-Fi (registered trademark) is used.

Figure 2:
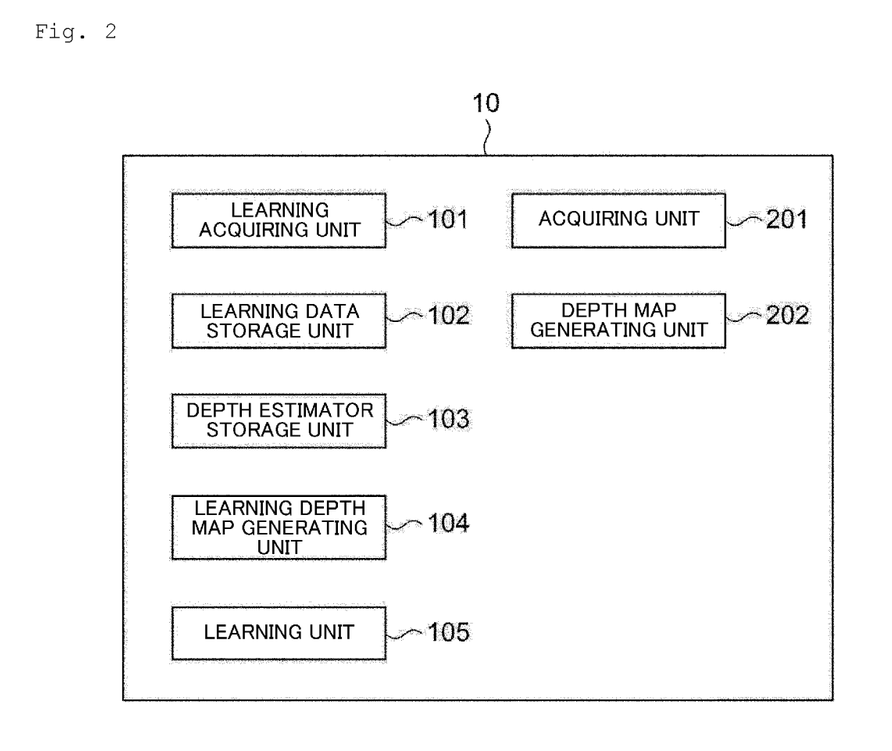
FIG. 2 is a block diagram showing an example of functional components of the depth estimation apparatus 10 according to the first embodiment.

Next, functional components of the depth estimation apparatus 10 according to the first embodiment will be described. FIG. 2 is a block diagram showing an example of the functional components of the depth estimation apparatus 10. As shown in FIG. 2, as functional components, the depth estimation apparatus 10 has a learning acquiring unit 101, a learning data storage unit 102, a depth estimator storage unit 103, a learning depth map generating unit 104, a learning unit 105, an acquiring unit 201, and a depth map generating unit 202. Each functional component is realized as a result of the CPU 11 reading a depth estimation model learning program and a depth estimation program stored in the ROM 12 or the storage 14, deploying the programs on the RAM 13, and executing the programs.

The learning acquiring unit 101 acquires a plurality of pieces of learning image data. Each piece of learning image data is data in which an image $I_i$ for learning and a correct-answer depth map $T_i$ are associated with each other. The correct-answer depth map $T_i$ is a depth map of a correct answer in which a depth of a space that appears in the image $I_i$ for learning is imparted to each pixel in the image in advance. A depth according to the present embodiment represents a distance in a depth direction between a position of a camera where the image had been captured and a subject that appears in the image. An arbitrary unit may be used as a unit of a distance representing a depth. For example, meters or millimeters may be used as the unit of a distance representing a depth.

In a depth map according to the present embodiment, a depth in the depth direction of a space that appears in an image is imparted to each pixel of the image. In addition, a depth map is two-dimensional data having a same width and a same height as an image captured by a camera. It should be noted that i denotes an index for identifying learning image data.

There are a plurality of various known means for obtaining the correct-answer depth map $T_i$ that corresponds to the image $I_i$ for learning and any of such means may be used. For example, as in the case of the technique disclosed in NPL 1 or NPL 3, a depth map obtained using a general depth camera may be used as the correct-answer depth map $T_i$. Alternatively, the correct-answer depth map $T_i$ may be generated based on a depth measured using an image captured by a stereoscopic camera. Yet alternatively, the correct-answer depth map $T_i$ may be generated based on a depth measured using a plurality of images.

Upon receiving the plurality of pieces of learning image data, the learning acquiring unit 101 stores each of the plurality of pieces of learning image data in the learning data storage unit 102.

The learning data storage unit 102 stores a plurality of pieces of learning image data. An image $I_i$ for learning and a correct-answer depth map $T_i$ of the image $I_i$ for learning are associated with each other in a single piece of learning image data.

The depth estimator storage unit 103 stores a depth estimator f for generating a depth map from an image. The depth estimator f is updated by the learning unit 105 to be described later.

As the depth estimator f, an arbitrary function capable of outputting a depth map or a depth using an image or a pixel value as input is used. For example, a neural network can be used as the depth estimator f. The neural network can be configured in any way as long as the neural network is capable of realizing the input/output relationship described above. As the neural network, for example, the neural network described in NPL 1 or NPL 2 described earlier can be used. Alternatively, as the neural network, a neural network based on DenseNet described in Reference 1 below and the like can be used.

(Reference 1) Gao Huang, Zhuang Liu, Laurens van der Maaten, and Kilian Q. Weinberger. "Densely Connected Convolutional Network," In Proc. Conference on Computer Vision and Pattern Recognition (CVPR), 2017

A configuration of a neural network as the depth estimator f is not limited to that described above and may be any configuration as long as the input/output relationship described above is satisfied.

The depth estimation apparatus 10 according to the present embodiment executes two different steps of processing, namely, depth estimation processing for obtaining a depth map of an image using the depth estimator f and depth estimation model learning processing for learning the depth estimator f. The depth estimation model learning processing is processing that must be performed at least once before estimating a depth of an image. For example, when the depth estimator f is a neural network, the depth estimation model learning processing is processing for suitably determining weight that is a parameter of the neural network based on learning image data. Hereinafter, the depth estimation model learning processing will be explained first, followed by an explanation of the depth estimation processing.

With respect to each of the images $I_i$ for learning that are stored in the learning data storage unit 102, the learning depth map generating unit 104 inputs the image $I_i$ for learning into the depth estimator f that is stored in the depth estimator storage unit 103. In addition, with respect to each of the images $I_i$ for learning, the learning depth map generating unit 104 generates an estimated depth map $D_i$ for learning which is a depth map that corresponds to the image $I_i$ for learning. Therefore, a relationship among the image $I_i$ for learning, the depth estimator f, and the estimated depth map $D_i$ for learning is expressed as $D_i = f(I_i)$.

The learning unit 105 causes the depth estimator f to perform learning using a loss function that outputs a loss value in accordance with an error between a depth of each pixel of the estimated depth map $D_i$ for learning and a depth of each pixel of a correct-answer depth map $T_i$ with respect to the same image $I_i$ for learning. In this case, the estimated depth map $D_i$ for learning was generated by the learning depth map generating unit 104. The correct-answer depth map $T_i$ was stored in the learning data storage unit 102.

Under ordinary circumstances, the depth of each pixel of the estimated depth map $D_i$ for learning and the depth of each pixel of the correct-answer depth map $T_i$ with respect to the same image $I_i$ for learning should take a same value. However, when accuracy of estimation of the depth estimator f is low, an error can occur between the depth of each pixel of the estimated depth map $D_i$ for learning and the depth of each pixel of the correct-answer depth map $T_i$.

In this case, learning of the depth estimator f is performed so that a predetermined loss function decreases. At this point, the loss function is favorably designed so that the smaller the error between the depth of each pixel of the estimated depth map $D_i$ for learning and the depth of each pixel of the correct-answer depth map $T_i$, the smaller a loss value taken by the loss function, and the larger the error between the depth of each pixel of the estimated depth map $D_i$ for learning and the depth of each pixel of the correct-answer depth map $T_i$, the larger the loss value taken by the loss function.

In consideration thereof, NPL 3 described above discloses that a sum of errors between the depth of each pixel of the correct-answer depth map $T_i$ and the depth of each pixel of the estimated depth map $D_i$ for learning be adopted as a loss function. For example, when an L1 loss is used as the error from the depth of each pixel of the estimated depth map $D_i$ for learning, a loss function $l_{L1}$ can be determined as represented by Equation (1) below.

[Math. 1]

$$l_{L1}(T_i, D_i) = \frac{1}{N} \sum_{i=1}^{N} \sum_{y \in Y_i} \sum_{x \in X_i} |e_i(x, y)|$$

(1)

In equation (1), $X_i$ represents a domain of x and $Y_i$ represents a domain of y. x, y represents a position of a pixel on each depth map. N denotes the number of sets of an image for learning and a correct-answer depth map included in learning image data or a constant that is equal to or smaller than the number of sets. In addition, $|e_i(x, y)|$ represents an error between a depth $T_i(x, y)$ of a pixel at coordinates (x, y) of the correct-answer depth map $T_i$ and a depth $D_i(x, y)$ of a pixel at coordinates (x, y) of the estimated depth map $D_i$ for learning. Therefore, $e_i(x, y) = T_i(x, y) - D_i(x, y)$ is satisfied.

With the loss function represented by equation (1) above, the smaller the error $|e_i(x, y)|$ between the depth of each pixel of the correct-answer depth map $T_i$ and the depth of each pixel of the estimated depth map $D_i$ for learning, the smaller the loss value taken by the loss function. Therefore, when the depth of each pixel of the correct-answer depth map $T_i$ is equal to the depth of each pixel of the estimated depth map $D_i$ for learning, the loss function represented by equation (1) above takes a value of 0. As a result, by updating the parameter of the depth estimator f so as to reduce the loss value taken by the loss function represented by equation (1) above with respect to various correct-answer depth maps $T_i$ and various estimated depth maps $D_i$ for learning, the depth estimator f capable of outputting an estimated depth map can be obtained.

Alternatively, as in the case of the method disclosed in NPL 1 described earlier, a loss function represented by equation (2) below may be used.

[Math. 2]

$$l_{BerHu}(T_i, D_i) = \frac{1}{N}\sum_{i=1}^{N}\sum_{y \in Y_i}\sum_{x \in X_i} d_i(x, y) \quad (2)$$

$$d_i(x, y) = \begin{cases} |e_i(x, y)| & \text{if } |e_i(x, y)| \leq c \\ \frac{(e_i(x, y))^2 + c^2}{2c} & \text{ohterwise} \end{cases}$$

The loss function represented by equation (2) above is a function such that, when the error $|e_i(x, y)|$ between the depth of each pixel of the correct-answer depth map $T_i$ and the depth of each pixel of the estimated depth map $D_i$ for learning is equal to or smaller than a threshold c, a degree of increase of the loss value in accordance with an increase in the error $|e_i(x, y)|$ becomes linear. On the other hand, in the loss function represented by equation (2) above, when the error $|e_i(x, y)|$ is larger than the threshold c, the degree of increase of the loss value in accordance with an increase in the error $|e_i(x, y)|$ becomes a quadratic function of the error $|e_i(x, y)|$.

However, existing loss functions such as those represented by equation (1) and equation (2) described above have a problem. A case where a distance between a camera and a subject is physically long is conceivable as a region corresponding to pixels of which the error $|e_i(x, y)|$ is large among a depth map. Alternatively, a case where a depth structure is extremely complex is conceivable as a region corresponding to pixels of which the error $|e_i(x, y)|$ is large among a depth map.

Such locations among a depth map are often regions that include uncertainty. Therefore, such locations among a depth map are often regions of which a depth cannot be accurately estimated using the depth estimator f. As a result, performing learning by placing a greater emphasis on a region that includes pixels of which the error $|e_i(x, y)|$ is large among a depth map does not necessarily improve accuracy of the depth estimator f.

The loss function represented by equation (1) above takes a same loss value regardless of a magnitude of the error $|e_i(x, y)|$. On the other hand, the loss function represented by equation (2) above is designed so as to take a larger loss value when the error $|e_i(x, y)|$ is large. Therefore, even when the depth estimator f is learned using the loss function represented by equation (1) above or equation (2) above, there is a limit to improving accuracy of estimation by the depth estimator f.

In consideration thereof, in the first embodiment, a first loss function that is a loss function represented as follows is used. A value of a first loss function $l_1(T_i, D_i)$ takes a loss value which, when the error $|e_i(x, y)|$ is equal to or smaller than a threshold c, linearly increases with respect to an increase in an absolute value $|e_i(x, y)|$ of the error. In addition, the value of the first loss function $l_1(T_i, D_i)$ takes a loss value which, when the error $|e_i(x, y)|$ is larger than the threshold c, varies in accordance with a radical root of the error $|e_i(x, y)|$.

[Math. 3]

$$l_1(T_i, D_i) = \frac{1}{N}\sum_{i=1}^{N}\sum_{y \in Y_i}\sum_{x \in X_i} d_i(x, y) \quad (3)$$

$$d_i(x, y) = \begin{cases} |e_i(x, y)| & \text{if } |e_i(x, y)| \leq c \\ \sqrt{2c|e_i(x, y)| - c^2} & \text{ohterwise} \end{cases}$$

In the first loss function $l_1(T_i, D_i)$ in equation (3) described above, with respect to a pixel of which the error $|e_i(x, y)|$ is equal to or smaller than the threshold c, points that linearly increases with respect to an increase in $|e_i(x, y)|$ are similar to those of other loss functions (for example, the loss function represented by equation (1) above or equation (2) above).

However, in the first loss function $l_1(T_i, D_i)$ in equation (3) described above, with respect to a pixel of which the error lei (x, y)| is larger than the threshold c, the first loss function $l_1(T_i, D_i)$ becomes a square function with respect to an increase in $|e_i(x, y)|$. Therefore, in the present embodiment, a smaller value is estimated as the loss value and the loss value is de-emphasized with respect to pixels including uncertainty as described earlier. Accordingly, robustness of estimation by the depth estimator f can be increased and accuracy can be improved.

For this reason, the learning unit 105 causes the depth estimator f stored in the depth estimator storage unit 103 to perform learning so as to reduce the value of the first loss function 11 $(T_i, D_i)$ in equation (3) described above.

It should be noted that the first loss function $l_1(T_i, D_i)$ in equation (3) described above is sectionally differentiable with respect to a parameter w of the depth estimator f stored in the depth estimator storage unit 103. Therefore, the parameter w of the depth estimator f can be updated using a gradient method. For example, when the learning unit 105 causes the parameter w of the depth estimator f to be learned based on a stochastic gradient descent method, the parameter w is updated per step based on arrow notation (4) described below, where a denotes a coefficient set in advance.

[Math. 4]

$$w \leftarrow w - \alpha\frac{\partial}{\partial w}l_1 \quad (4)$$

A differential value of the loss function $l_1$ with respect to an arbitrary parameter w of the depth estimator f can be calculated using an error back propagation method. When causing the parameter w of the depth estimator f to be learned, the learning unit 105 may introduce an improved method of a general stochastic gradient descent method such as using a momentum term or using weight decay. Alternatively, the learning unit 105 may cause learning of the parameter w of the depth estimator f to be performed using another gradient descent method.

In addition, the learning unit 105 stores the learned parameter w of the depth estimator f in the depth estimator storage unit 103. Accordingly, the depth estimator f for accurately estimating a depth map is to be obtained.

Next, the depth estimation apparatus 10 receives an input image that is a depth map generation object and generates an estimated depth map of the input image.

The acquiring unit 201 acquires the input image that is a depth map generation object.

The depth map generating unit 202 inputs the input image acquired by the acquiring unit 201 into the depth estimator f that is stored in the depth estimator storage unit 103 and generates an estimated depth map that represents a depth map corresponding to the input image.

Since the depth estimator f stored in the depth estimator storage unit 103 is a model having been learned in advance so as to minimize the loss function represented by equation (3) above, an estimated depth map with respect to the input image is accurately generated.

Next, operations of the depth estimation apparatus 10 will be described.

Figure 3:
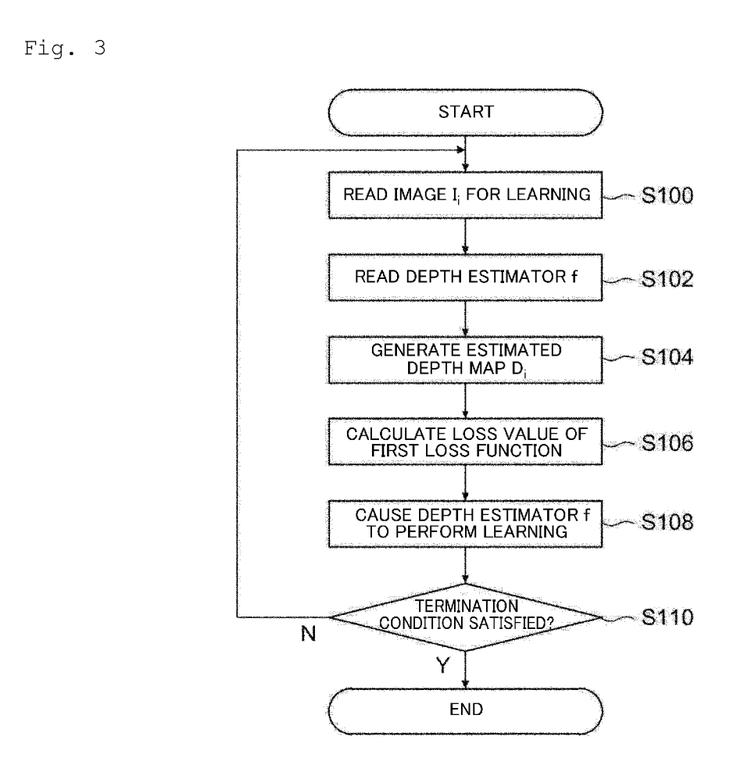
FIG. 3 is a flow chart showing a flow of depth estimation model learning processing by the depth estimation apparatus 10 according to the first embodiment.

FIG. 3 is a flow chart showing a flow of depth estimation model learning processing by the depth estimation apparatus 10. The depth estimation model learning processing is performed as a result of the CPU 11 reading a depth estimation model learning processing program stored in the ROM 12 or the storage 14, deploying the program on the RAM 13, and executing the program.

First, as the learning acquiring unit 101, the CPU 11 acquires a plurality of pieces of learning data having been input from, for example, the input unit 15 and stores the pieces of learning data in the learning data storage unit 102. In addition, upon receiving an instruction signal to execute learning processing, the CPU 11 executes the depth estimation model learning processing shown in FIG. 3.

In step S100, the CPU 11 functions as the learning depth map generating unit 104 and reads each of the images $I_i$ for learning being stored in the learning data storage unit 102.

In step S102, the CPU 11 functions as the learning depth map generating unit 104 and reads the depth estimator f being stored in the depth estimator storage unit 103.

In step S104, the CPU 11 functions as the learning depth map generating unit 104, inputs each of the images $I_i$ for learning having been read in step S100 described above into the depth estimator f having been read in step S102 described above, and generates an estimated depth map $D_i$ for learning that corresponds to the image $I_i$ for learning.

In step S106, the CPU 11 functions as the learning unit 105 and calculates, with respect to each of the plurality of images $I_i$ for learning, each loss value of the loss function $l_1$ ($T_i$, $D_i$) in accordance with an error between a depth of each pixel of the estimated depth map $D_i$ for learning having been generated in step S104 described above and a depth of each pixel of a correct-answer depth map $T_i$ stored in the learning data storage unit 102 with respect to the same image $I_i$ for learning.

In step S108, the CPU 11 functions as the learning unit 105 and causes the depth estimator f to perform learning based on each of the loss values calculated in step S106 described above so as to minimize the loss function $l_1$ ($T_i$, $D_i$) represented by equation (3) above. In addition, the CPU 11 functions as the learning unit 105 and stores the learned depth estimator f in the depth estimator storage unit 103.

In step S110, the CPU 11 functions as the learning unit 105 and determines whether or not an iteration termination condition is satisfied. When the iteration termination condition is satisfied, processing is terminated. On the other hand, when the iteration termination condition is not satisfied, a return is made to step S100. Each processing step from step S100 to step S108 is iterated until the termination condition is satisfied.

It should be noted that the termination condition is set in advance. As the iteration condition, for example, "terminate after a predetermined number of iterations (for example, 100 times)" or "terminate when a decrease in loss value stays within a certain range during a certain number of iterations" is set.

By executing the depth estimation model learning processing described above, the parameter w of the depth estimator f is updated and the depth estimator f for accurately estimating a depth map is stored in the depth estimator storage unit 103.

Figure 4:
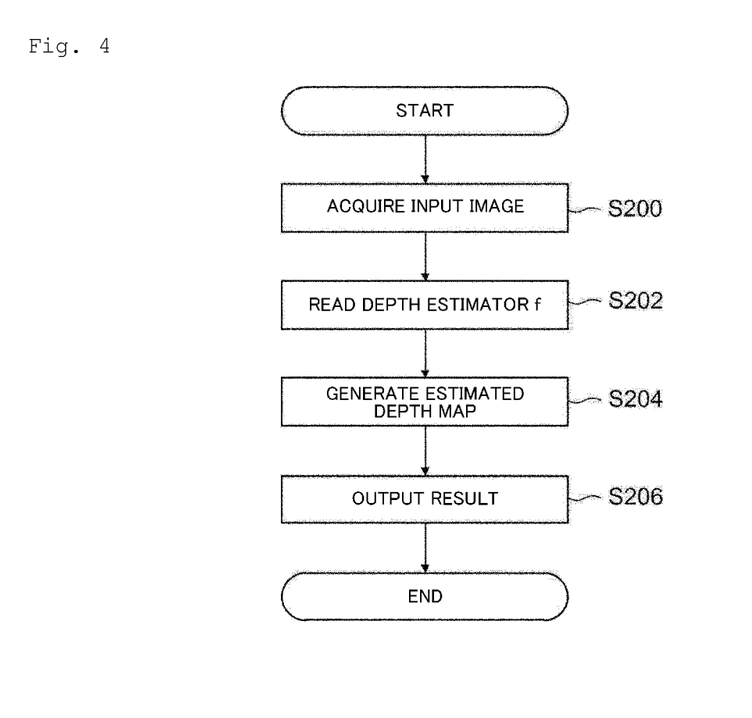
FIG. 4 is a flowchart showing a flow of depth estimation processing by the depth estimation apparatus 10 according to the first embodiment.

Next, the CPU 11 functions as the acquiring unit 201 and, for example, when receiving an input image that is a depth map generation object having been input from the input unit 15, executes the depth estimation processing shown in FIG. 4.

In step S200, the CPU 11 functions as the acquiring unit 201 and acquires the input image.

In step S202, the CPU 11 functions as the depth map generating unit 202 and reads the depth estimator f being stored in the depth estimator storage unit 103.

In step S204, the CPU 11 functions as the depth map generating unit 202, inputs the input image having been acquired in step S200 described above into the depth estimator f having been read in step S202 described above, and generates an estimated depth map which represents a depth map that corresponds to the input image.

In step S206, the CPU 11 functions as the depth map generating unit 202, outputs the estimated depth map having been generated in step S204 described above, and terminates the depth estimation processing.

As described above, the depth estimation apparatus 10 according to the present embodiment inputs an image for learning into a depth estimator and generates an estimated depth map for learning which is a depth map that corresponds to the image for learning. In addition, the depth estimation apparatus causes the depth estimator to perform learning so as to reduce, with respect to each of the errors between a depth of the generated estimated depth map for learning and a depth of a correct-answer depth map, a value of a loss function set such that a degree of increase of a loss value with respect to a pixel at which the error is larger than a threshold is smaller than a degree of increase of a loss value with respect to a pixel at which the error is equal to or smaller than the threshold. Accordingly, a depth estimator for accurately estimating a depth of a space that appears on an image can be obtained.

In addition, the depth estimation apparatus 10 according to the present embodiment inputs an input image into a depth estimator and generates an estimated depth map that corresponds to the input image. In this case, the depth estimator generates, from the image, a depth map in which a depth of a space that appears on the image is imparted to each pixel of the image. Accordingly, the depth of the space that appears on the image can be accurately estimated.

Specifically, the depth estimation apparatus according to the present embodiment causes a depth estimator f to perform learning using a loss function in which importance of a pixel corresponding to a region of which the error is large that is a location where estimation of a depth is difficult has been reduced such as the loss function represented by equation (3) described above. Using a loss function such as that represented by equation (3) described above enables learning by the depth estimator f to be reliably performed with respect to a region of pixels of which indeterminacy is low and the error is small. On the other hand, as represented by equation (3) described above, with respect to a region of pixels of which indeterminacy is high and the error is large, learning of the depth estimator f is performed by reducing importance of the region. Accordingly, the depth estimator f for accurately estimating a depth map can be obtained.

Second Embodiment

Next, a second embodiment will be described. It should be noted that, since a configuration of a depth estimation apparatus according to the second embodiment is similar to the configuration in the first embodiment, same reference signs will be added and a description will be omitted.

A depth estimation apparatus 10 according to the second embodiment differs from that according to the first embodiment in that the depth estimation apparatus 10 further causes a depth estimator f to perform learning so as to reduce an error between an edge representing a degree of variation of a depth of an estimated depth map for learning and an edge representing a degree of variation of a depth of a correct-answer depth map.

An estimated depth map generated by the depth estimator f obtained by the depth estimation apparatus according to the first embodiment may sometimes be blurred as a whole. In particular, when a convolutional neural network is used as the depth estimator f, a generated estimated depth map may end up being excessively smooth and appear blurry as a whole.

Such an estimated depth map has a problem in that a depth of an edge portion that changes abruptly is not accurately reproduced. For example, in an estimated depth map that appears blurry as a whole, a depth of a boundary of a wall or a brink of an object may not always be accurately reproduced.

In consideration thereof, the depth estimation apparatus 10 according to the second embodiment further causes a depth estimator f to perform learning so as to generate an estimated depth map with greater accuracy.

A desirable state of the depth estimator f is that an edge of an estimated depth map having been generated by the depth estimator f and an edge of a correct-answer depth map approach each other. To this end, in the second embodiment, a second loss function represented by equation (5) below is introduced. In addition, the depth estimation apparatus 10 according to the second embodiment further updates a parameter w of the depth estimator f so as to minimize a second loss function $l_2$ in equation (5) below.

[Math. 5]

$$l_2(T_i, D_i) = \frac{1}{N} \sum_{i=1}^{N} \sum_{y \in Y_i} \sum_{x \in X_i} |E(T_i(x, y)) - E(D_i(x, y))| \quad (5)$$

In equation (5) described above, E denotes an edge detector and $E(T_i(x, y))$ represents a value at coordinates (x, y) after applying the edge detector E to a correct-answer depth map $T_i$. In addition, $E(D_i(x, y))$ represents a value at the coordinates (x, y) after applying the edge detector E to an estimated depth map $D_i$ for learning.

As the edge detector, any edge detector may be used as long as the detector is differentiable. For example, a Sobel filter can be used as the edge detector. Since the Sobel filter can be described as a convolution operation, there is also an advantage that the Sobel filter can be readily implemented as a convolutional layer of a convolutional neural network.

To this end, a learning unit 105 according to the second embodiment further causes the depth estimator f to perform learning so as to reduce an error between an edge $E(T_i(x, y))$ representing a degree of variation of a depth of a correct-answer depth map $T_i$ and an edge $E(D_i(x, y))$ representing a degree of variation of a depth of an estimated depth map $D_i$ for learning. Specifically, the learning unit 105 according to the second embodiment causes the depth estimator f to further perform learning so as to reduce the value of the second loss function $l_2$ represented in equation (5) described above.

The second loss function $l_2(T_i, D_i)$ defined in equation (5) described above is also sectionally differentiable with respect to a parameter w of the depth estimator f insofar as the edge detector E is differentiable. Therefore, the parameter w of the depth estimator f can be updated using a gradient method. For example, when the learning unit 105 according to the second embodiment causes the parameter w of the depth estimator f to be learned based on a stochastic gradient descent method, the parameter w is updated per step based on arrow notation (6) described below, where a denotes a coefficient set in advance.

[Math. 6]

$$w \leftarrow w - \alpha \frac{\partial}{\partial w} l_2 \quad (6)$$

A differential value of the loss function $l_2$ with respect to an arbitrary parameter w of the depth estimator f can be calculated using an error back propagation method. When causing the parameter w of the depth estimator f to be learned, the learning unit 105 may introduce an improved method of a general stochastic gradient descent method such as using a momentum term or using weight decay. Alternatively, the learning unit 105 may cause learning of the parameter w of the depth estimator f to be performed using another gradient descent method.

Next, operations of the depth estimation apparatus 10 according to the second embodiment will be described.

Figure 5:
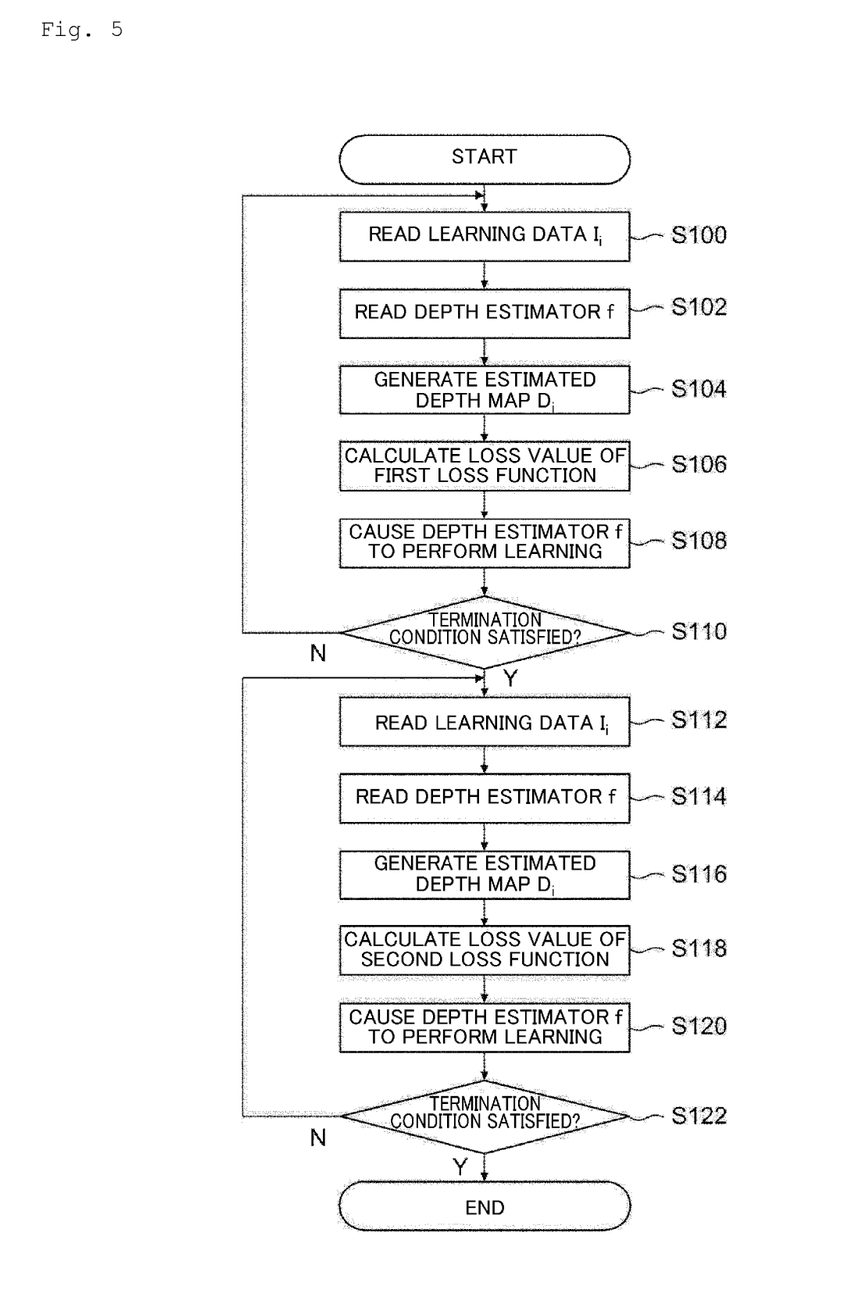
FIG. 5 is a flow chart showing a flow of depth estimation model learning processing by a depth estimation apparatus 10 according to a second embodiment.

FIG. 5 is a flow chart showing a flow of depth estimation model learning processing by the depth estimation apparatus 10 according to the second embodiment.

Each of the processing steps from step S100 to step S110 are executed in a similar manner to the first embodiment.

In step S112, the CPU 11 functions as the learning depth map generating unit 104 and reads each of the images $I_i$ for learning being stored in the learning data storage unit 102.

In step S114, the CPU 11 functions as the learning depth map generating unit 104 and reads the depth estimator f being stored in the depth estimator storage unit 103.

In step S116, the CPU 11 functions as the learning depth map generating unit 104, inputs each of the images $I_i$ for learning having been read in step S112 described above into the depth estimator f having been read in step S114 described above, and generates an estimated depth map $D_i$ for learning that corresponds to the image $I_i$ for learning.

In step S118, the CPU 11 functions as the learning unit 105 and calculates, with respect to each of the plurality of images $I_i$ for learning, each loss value of the second loss function $l_2(T_i, D_i)$ in accordance with an error between a depth of each pixel of the estimated depth map $D_i$ for learning having been generated in step S116 described above and a depth of each pixel of a correct-answer depth map $T_i$ stored in the learning data storage unit 102 with respect to the same image $I_i$ for learning.

In step S120, the CPU 11 functions as the learning unit 105 and causes the depth estimator f to perform learning based on each of the loss values calculated in step S118 described above so as to minimize the second loss function $l_2(T_i, D_i)$ represented by equation (6) above. In addition, the CPU 11 functions as the learning unit 105 and stores the learned depth estimator f in the depth estimator storage unit 103.

In step S122, the CPU 11 functions as the learning unit 105 and determines whether or not an iteration termination condition is satisfied. When the iteration termination condition is satisfied, processing is terminated. On the other hand, when the iteration termination condition is not satisfied, a return is made to step S112. Each processing step from step S112 to step S120 is iterated until the termination condition is satisfied.

It should be noted that the termination condition is set in advance. As the iteration condition, for example, "terminate after a predetermined number of iterations (for example, 100 times)" or "terminate when a decrease in loss value stays within a certain range during a certain number of iterations" is set.

By executing the depth estimation model learning processing described above, the parameter w of the depth estimator f is updated and the depth estimator f for accurately estimating a depth map while taking edges into consideration is stored in the depth estimator storage unit 103.

It should be noted that, since other components and operations of the depth estimation apparatus according to the second embodiment are similar to those of the first embodiment, descriptions thereof will be omitted.

As described above, the depth estimation apparatus according to the second embodiment causes a depth estimator to perform learning so as to reduce an error between an edge representing a degree of variation of a depth of an estimated depth map and an edge representing a degree of variation of a depth of a correct-answer depth map. Accordingly, the depth estimator f for accurately estimating a depth map while taking edges into consideration can be obtained. In addition, the depth estimation apparatus according to the second embodiment can accurately estimate a depth of an image using the depth estimator f for accurately estimating a depth map while taking edges into consideration.

The depth estimation apparatus 10 according to the second embodiment further updates, with the second loss function represented by equation (5) described above, the parameter w of the depth estimator f once having been learned with the first loss function represented by equation (3) described above. As a result, accuracy of estimation of a depth by the depth estimator f does not decline.

Normally, when causing the parameter w of the depth estimator f to be learned so as to minimize both the first loss function represented by equation (3) described above and the second loss function represented by equation (5) described above, a loss function resulting from a linear combination of the first loss function represented by equation (3) described above and the second loss function represented by equation (5) described above is defined as a new loss function. In addition, the parameter w of the depth estimator f is updated so as to minimize the new loss function.

Conversely, a feature of the second embodiment is that the first loss function represented by equation (3) described above and the second loss function represented by equation (5) described above are individually minimized. Compared to a case of minimizing a new loss function obtained by a linear combination of the first loss function represented by equation (3) described above and the second loss function represented by equation (5) described above, a learning method of the depth estimation apparatus 10 according to the second embodiment has an advantage that the parameter w of the depth estimator f can be learned without having to manually adjust a weight of the linear combination.

Generally, it is extremely difficult to adjust a weight when the first loss function represented by equation (3) described above and the second loss function represented by equation (5) described above are linearly combined. Adjusting the weight requires a costly operation involving repetitively performing learning while changing weights of the linear combination and identifying an optimal weight. Conversely, the learning method of the depth estimation apparatus 10 according to the second embodiment enables such an operation to be avoided.

<Result of Experiment>

Next, a result of an experiment in a case where estimation of a depth is performed using a depth estimator f constructed by the depth estimation apparatus 10 according to the second embodiment will be presented.

The present experiment was performed using data obtained by indoor photography using a camera equipped with a depth sensor. Learning was performed using learning image data including 48,000 sets of an image for learning and a correct-answer depth map, and an evaluation was performed using evaluation data including 654 sets of an image and a correct-answer depth map which differed from the learning image data.

Figure 6:
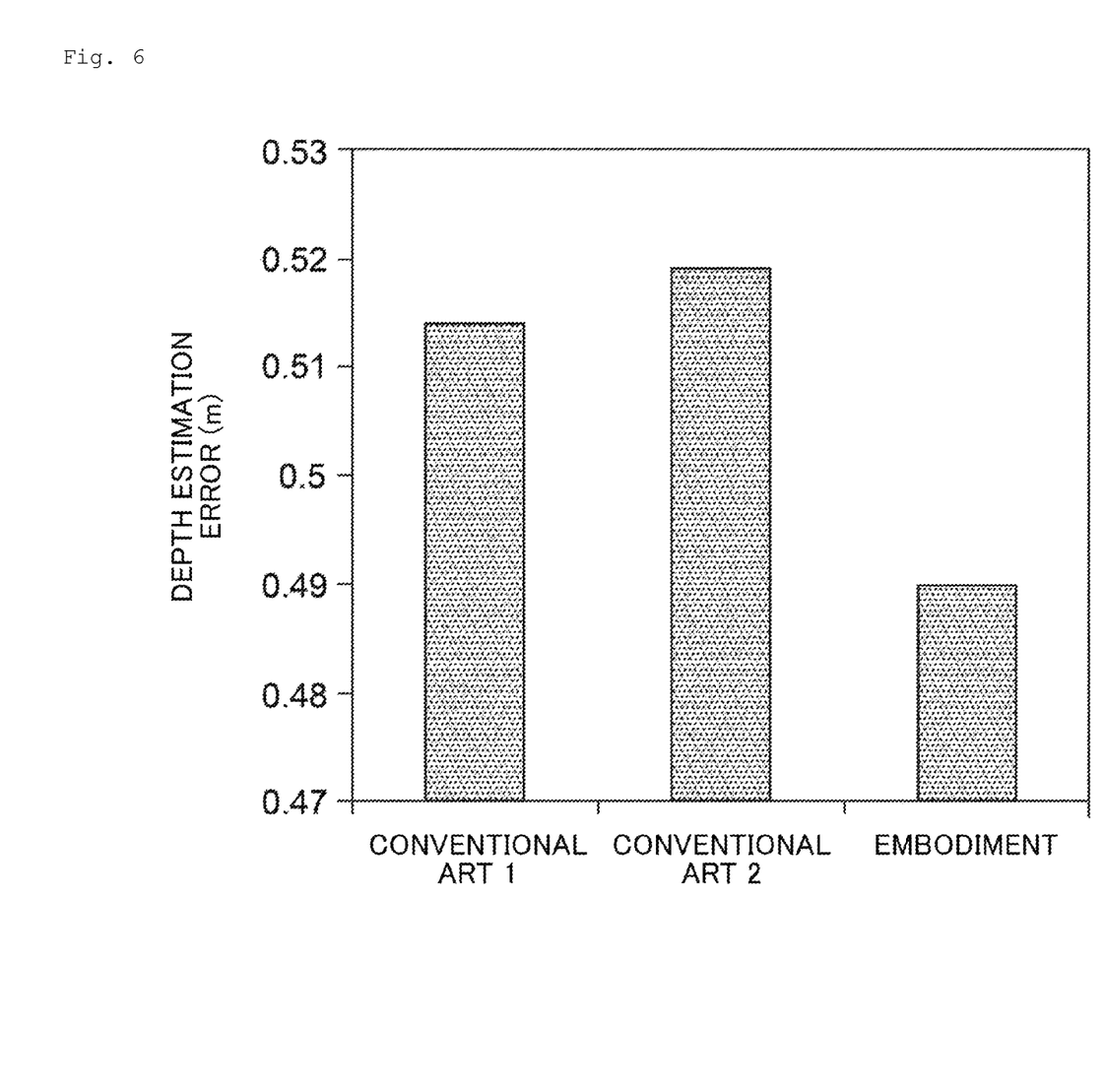
FIG. 6 is a diagram showing a result of an experiment.

FIG. 6 shows a depth estimation error (m) that represents an error of estimation of a depth in each method. "Conventional Art 1" shown in FIG. 6 denotes a result in a case of using the depth estimator f having been learned using equation (1) described above. In addition, "Conventional Art 2" shown in FIG. 6 denotes a result in a case of using the depth estimator f having been learned using equation (2) described above. "Embodiment" represents a result in a case of using the depth estimator f having been learned by the depth estimation apparatus 10 according to the second embodiment. As is apparent from FIG. 6, according to the present embodiment, recognition with significantly higher accuracy can be performed in comparison to conventional art.

It should be noted that various processors other than a CPU can execute linguistic processing that has been executed by the CPU in the respective embodiments described above by loading software (programs). Examples of the processor in this case include a PLD (Programmable Logic Device) of which a circuit configuration can be changed after being manufactured such as an FPGA (Field-Programmable Gate Array) and a dedicated electric circuit that is a processor having a circuit configuration exclusively designed for executing specific processing such as an ASIC (Application Specific Integrated Circuit). In addition, the depth estimation processing and the depth estimation model learning processing may be executed by one of these various types of processors or may be executed by a combination of two or more processors of a same type or different types (for example, a combination of a plurality of FPGAs or a combination of a CPU and an FPGA). Furthermore, specifically, a hardware structure of these various types of processors is an electric circuit that combines circuit elements such as semiconductor elements.

In addition, while an aspect in which the depth estimation program and the depth estimation model learning program are stored (installed) in advance in the storage 14 has been explained in the embodiments described above, this aspect is not restrictive. The programs may be provided in a mode of being stored in a non-transitory storage medium such as a CD-ROM (Compact Disk Read Only Memory), a DVD-ROM (Digital Versatile Disk Read Only Memory), or a USB (Universal Serial Bus) memory. Alternatively, a mode may be adopted in which the programs are downloaded from an external apparatus via a network.

Furthermore, the depth estimation processing and the depth estimation model learning processing according to the present embodiment may be constituted by a computer, a server, or the like equipped with a general-purpose arithmetic processing apparatus, a storage apparatus, and the like, in which case each step of processing is to be executed by a program. The program is stored in a storage apparatus and can be recorded on a recording medium such as a magnetic disk, an optical disc, or a semiconductor memory and can also be provided through a network. It is needless to say that any of the other components need not necessarily be realized by a single computer or a server and may be realized in a distributed manner across a plurality of computers that are connected to each other by a network.

It should be noted that the present embodiment is not limited to the respective embodiments described above and various modifications and applications can be made without departing from the spirit and scope of the embodiments.

For example, while a case where the depth estimation apparatus 10 executes the depth estimation processing and the depth estimation model learning processing has been explained as an example in the respective embodiments described above, this example is not restrictive. For example, the depth estimation apparatus 10 may only execute the depth estimation processing, and a depth estimation model learning apparatus being an example of an apparatus that differs from the depth estimation apparatus 10 may execute the depth estimation model learning processing.

The following appendants are further disclosed in relation to the respective embodiments described above.

(Appendant 1)

A depth estimation apparatus configured so as to include: a memory; and at least one processor connected to the memory, wherein the processor acquires an input image, inputs the acquired input image into a depth estimator for generating, from an image, a depth map in which a depth of a space that appears on the image is imparted to each pixel of the image and generates an estimated depth map that represents the depth map corresponding to the input image, and the depth estimator is a model having been learned in advance so as to reduce, with respect to each error between the depth of the estimated depth map for learning and the depth of a correct-answer depth map representing the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

(Appendant 2)

A depth estimation model learning apparatus configured so as to include: a memory; and at least one processor connected to the memory, wherein the processor inputs an image for learning into a depth estimator for generating, from an image, a depth map in which a depth of a space that appears on the image is imparted to each pixel of the image and generates an estimated depth map for learning that represents the depth map corresponding to the image for learning, and causes the depth estimator to perform learning so as to reduce a value of a loss function set such that a degree of increase of a loss value with respect to a pixel at which an error between the depth of the generated estimated depth map for learning and the depth of a correct-answer depth map representing the depth map of a correct answer is larger than a threshold is smaller than a degree of increase of a loss value with respect to a pixel at which the error is equal to or smaller than the threshold.

(Appendant 3)

A non-transitory storage medium storing a depth estimation program for causing a computer to execute processing for: acquiring an input image; and inputting the acquired input image into a depth estimator for generating, from an image, a depth map in which a depth of a space that appears on the image is imparted to each pixel of the image and generating an estimated depth map that represents the depth map corresponding to the input image, wherein the depth estimator is a model having been learned in advance so as to reduce, with respect to each error between the depth of the estimated depth map for learning and the depth of a correct-answer depth map representing the depth map of a correct answer, a value of a loss function set such that a degree of increase of a loss value with respect to a pixel at which the error is larger than a threshold is smaller than a degree of increase of a loss value with respect to a pixel at which the error is equal to or smaller than the threshold.

(Appendant 4)

A non-transitory storage medium storing a depth estimation model learning program in which a computer executes processing for: inputting an image for learning into a depth estimator for generating, from an image, a depth map in which a depth of a space that appears on the image is imparted to each pixel of the image and generating an estimated depth map for learning that is the depth map corresponding to the image for learning; and causing the depth estimator to perform learning so as to reduce a value of a loss function set such that a degree of increase of a loss value with respect to a pixel at which an error between the depth of the generated estimated depth map for learning and the depth of a correct-answer depth map representing the depth map of a correct answer is larger than a threshold is smaller than a degree of increase of a loss value with respect to a pixel at which the error is equal to or smaller than the threshold.

REFERENCE SIGNS LIST

10 Depth estimation apparatus
101 Learning acquiring unit
102 Learning data storage unit
103 Depth estimator storage unit
104 Learning depth map generating unit
105 Learning unit
201 Acquiring unit
202 Depth map generating unit

The invention claimed is:

1. A apparatus for estimating a depth, comprising a processor configured to execute operations comprising:
   acquiring an input image; and
   generating, based on the input image, an estimated depth map of the input image,
     wherein the generating the estimated depth map uses a model learned in advance, the model is configured to reduce a value of a loss function with respect to each error between a first depth of the estimated depth map for learning and a second depth of a correct-answer depth map of a correct answer,
the loss function maintains a first degree of increase of a first loss value as being smaller than a second degree of increase of a second loss value,
the first degree of increase of the first loss value is according to a square function,
the first degree of increase of the first loss value corresponds to a first pixel at which an error between the first depth of the estimated depth map and the second depth of the correct-answer depth map is larger than a threshold,
the second degree of increase of the second loss value corresponds to a second pixel at which the error between the first depth of the estimated depth map and the second depth of the correct-answer depth map is equal to or smaller than the threshold, and
the first pixel and the second pixel are distinct pixels of the input image.

2. The depth estimation apparatus according to claim 1, wherein the loss function is a function which:
when the error is larger than the threshold, takes the loss value that increases in accordance with a radical root of the error with respect to an increase in the error, and
when the error is equal to or smaller than the threshold, takes the loss value that linearly increases with respect to an increase in the error.

3. The depth estimation apparatus according to claim 1, wherein the model includes a convolutional neural network.

4. The depth estimation apparatus according to claim 1, wherein the depth of the image indicates at least a part of a three-dimensional shape of an object being recognized by a robot.

5. A depth estimation model learning apparatus comprising a processor configured to execute operations comprising:
receiving an image for learning;
generating an estimated depth map of the image for learning; and
training a model,
wherein the model is configured to reduce a value of a loss function with respect to each error between a first depth of the estimated depth map for learning and a second depth of a correct-answer depth map of a correct answer,
the loss function maintains a first degree of increase of a first loss value as being smaller than a second degree of increase of a second loss value,
the first degree of increase of the first loss value is according to a square function,
the first degree of increase of a first loss value corresponds to a first pixel at which an error between the first depth of the estimated depth map for learning and the second depth of the correct-answer depth map of a correct answer is larger than a threshold,
the second degree of increase of a second loss value corresponds to a second pixel at which the error between the first depth of the estimated depth map and the second depth of the correct-answer depth map is equal to or smaller than the threshold, and
the first pixel and the second pixel are in distinct regions of the input image.

6. The depth estimation model learning apparatus according to claim 5, wherein the loss function is a function which:
when the error is equal to or smaller than the threshold, takes the loss value that linearly increases with respect to an increase in the error, and
when the error is larger than the threshold, takes the loss value that linearly varies with respect to a radical root of the error.

7. The depth estimation model learning apparatus according to claim 6, wherein the model includes a convolutional neural network.

8. The depth estimation model learning apparatus according to claim 6, wherein the depth of the image indicates at least a part of a three-dimensional shape of an object being recognized by a robot.

9. The depth estimation model learning apparatus according to claim 6, wherein the training a model further comprises performing learning the model to reduce an error between a first edge representing a degree of variation of the depth of the estimated depth map for learning and a second edge representing a degree of variation of the depth of the correct-answer depth map.

10. The depth estimation model learning apparatus according to claim 5, wherein the training a model further comprises performing learning the model to reduce an error between a first edge representing a degree of variation of the depth of the estimated depth map for learning and a second edge representing a degree of variation of the depth of the correct-answer depth map.

11. A computer-implemented method for estimating a depth, comprising:
obtaining an input image; and
generating, based on the input image, an estimated depth map using a model, wherein the estimated depth map of the input image,
wherein the model is learned in advance, the model is configured to reduce, with respect to each error between a first depth of the estimated depth map and a second depth of a correct-answer depth map representing a correct answer, a value of a loss function,
the first degree of increase of the first loss value is according to a square function,
the loss function maintains a first degree of increase of a first loss value as being smaller than a second degree of increase of a second loss value,
the first degree of increase of the first loss value corresponds to a first pixel at which an error between the first depth of the estimated depth map and the second depth of the correct-answer depth map is larger than a threshold,
the second degree of increase of the second loss value corresponds to a second pixel at which the error between the first depth of the estimated depth map and the second depth of the correct-answer depth map is equal to or smaller than the threshold, and
the first pixel and the second pixel are in distinct regions of the input image.

12. The computer-implemented method according to claim 11, wherein the model includes a convolutional neural network.

13. The computer-implemented method according to claim 11, wherein the depth of the image indicates at least a part of a three-dimensional shape of an object being recognized by a robot.

14. The computer-implemented method according to claim 11, wherein the loss function is a function which:
when the error is larger than the threshold, takes the loss value that increases in accordance with a radical root of the error with respect to an increase in the error, and when the error is equal to or smaller than the threshold, takes the loss value that linearly increases with respect to an increase in the error.

\* \* \* \* \*